United States Patent
Noh et al.

(10) Patent No.: US 7,330,297 B2
(45) Date of Patent: Feb. 12, 2008

(54) FINE CONTROL OF ROTATION AND TRANSLATION OF DISCRETELY CONTROLLED MICROMIRROR

(75) Inventors: Jae Huek Noh, Fullerton, CA (US); Gyoung Il Cho, Seoul (KR); Cheong Soo Seo, Seoul (KR)

(73) Assignees: Angstrom, Inc, Seongnam (KR); Stereo Display, Inc, Anaheim, CA (US)

( * ) Notice: Subject to any disclaimer, the term of this patent is extended or adjusted under 35 U.S.C. 154(b) by 13 days.

(21) Appl. No.: 11/072,597

(22) Filed: Mar. 4, 2005

(65) Prior Publication Data

US 2006/0198012 A1    Sep. 7, 2006

(51) Int. Cl.
G02B 26/00    (2006.01)
G02B 26/08    (2006.01)

(52) U.S. Cl. .................................. 359/291; 359/225

(58) Field of Classification Search ............... 359/198, 359/223, 290, 291, 295, 298, 225
See application file for complete search history.

(56) References Cited

U.S. PATENT DOCUMENTS

| | | | |
|---|---|---|---|
| 2,002,376 A | 5/1935 | Mannhelmer |
| 2,002,378 A | 5/1935 | Mannhelmer |
| 4,407,567 A | 10/1983 | Michelet |
| 4,834,512 A | 5/1989 | Austin |
| 5,004,319 A | 4/1991 | Smither |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michalicek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,282,213 B1 | 8/2001 | Gutin |

(Continued)

FOREIGN PATENT DOCUMENTS

JP    08-043881    2/1996

(Continued)

*Primary Examiner*—Ricky Mack
*Assistant Examiner*—William C Choi

(57) ABSTRACT

A micromirror control system includes a bottom layer configured to support the micromirror control system including a stopper plate coupled to the bottom layer at a first end, configured to rotate about an axis. The micromirror control system also includes a micromirror, communicatively coupled to the stopper plate on a bottom side, and including a reflective top side configured to reflect light. Rotation of the stopper plate about the axis into contact with the micromirror is configured to adjust an orientation of the micromirror. In one aspect, the micromirror control system also includes an actuating device, communicatively coupled to the stopper plate, configured to control the rotation of the stopper plate about the axis. The advantages of the present invention include the ability to finely control translation and rotation of a discretely controlled micromirror.

49 Claims, 6 Drawing Sheets

U.S. PATENT DOCUMENTS

| | | |
|---|---|---|
| 6,315,423 B1 | 11/2001 | Yu |
| 6,329,737 B1 | 12/2001 | Jerman |
| 6,498,673 B1 | 12/2002 | Frigo |
| 6,507,366 B1 | 1/2003 | Lee |
| 6,549,730 B1 | 4/2003 | Hamada |
| 6,625,342 B2 * | 9/2003 | Staple et al. .................. 385/18 |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim |
| 7,023,466 B2 | 4/2006 | Favalora |
| 7,031,046 B2 | 4/2006 | Kim |
| 7,046,447 B2 | 5/2006 | Raber |
| 7,068,416 B2 | 6/2006 | Gim |
| 7,077,523 B2 | 7/2006 | Seo |
| 7,161,729 B2 | 1/2007 | Kim |
| 2002/0018407 A1 | 2/2002 | Komoto |
| 2002/0102102 A1 | 8/2002 | Watanabe |
| 2002/0135873 A1 | 9/2002 | Fovalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |

FOREIGN PATENT DOCUMENTS

| | | |
|---|---|---|
| JP | 11-069209 | 3/1999 |
| JP | 2002-288873 | 10/2002 |

* cited by examiner

FINE CONTROL OF ROTATION AND TRANSLATION OF DISCRETELY CONTROLLED MICROMIRROR

FIELD OF THE INVENTION

The present invention relates to micromirrors in general and more specifically to micromirror control.

BACKGROUND OF THE INVENTION

Micromirrors may be used in various optical applications instead of, or in addition to, conventional optoelectronic devices. It is desirable to be able to move the micromirrors by rotation and translation with very fine control.

A phase-only piston-style micromirror has been used for phase adaptive optics applications and a rotational micromirror has been used to deflect light. Most of these micromirrors have been controlled to have continuous displacements, which are determined at the equilibrium between electrostatic force and elastic force. The analog control is more complex than the digital or discrete control, and is not compatible with known semiconductor electronics technologies such as MOS, CMOS, etc. In addition, the micromirrors with continuous displacement actuated by electrostatic force undergo the classical snap-down phenomenon when the electric force exceeds the elastic force of mechanical structure. The snap-down phenomenon limits the translational and rotational ranges of a micromirror.

The high driving voltage is another disadvantage in use of the micromirrors with continuous displacement actuated by electrostatic force. To be compatible with IC components, it is desired that micromirrors are operated at low voltage which is compatible with the circuit operation or control voltage.

In a prior art micromirror array, such as, for example, the Digital Micromirror Device in U.S. Pat. Nos. 4,566,939, 5,083,857, and 6,232,936, each micromirror is actuated by digital control of a voltage. It has large rotation, low driving voltage, and is compatible with known semiconductor electronics technologies. However, it has only one degree of freedom, that is, rotation about a single axis, and it only has two level positions. Therefore, the micromirror array is merely an array of optical switches.

Therefore, what is needed is a system and method for very delicate control of the micromirror rotation and translation movement.

SUMMARY OF INVENTION

The present invention addresses the problems of the prior art and provides fine control of rotation and translation of a discretely controlled micromirror (DCM). As described in applicant's U.S. patent application Ser. No. 10/855,715, now patented as U.S. Pat. No. 7,031,046 for "Variable Focal Length Lens Comprising Micromirrors with Two Degrees of Freedom Rotation", which was filed on May 27, 2004, applicant's U.S. patent application Ser. No. 10/855,287, now patented as U.S. Pat. No. 6,934,072 entitled, "Variable Focal Length Lens Comprising Micromirrors with Two Degrees of Freedom Rotation and One Degree of Freedom Translation" which was filed on May 27, 2004, applicant's U.S. patent application Ser. No. 10/857,714 entitled, "Array of Micromirror Array Lenses", which was filed on May 28, 2004, and applicant's U.S. patent application Ser. No. 10/827,241 entitled, Discretely Controlled Micromirror with Multi-level Positions, which was filed on Jun. 18, 2004, the disclosures of which are incorporated by reference as if fully set forth herein, the micromirror array comprising the micromirrors with two degrees of freedom rotation or two degrees of freedom rotation and one degree of freedom translation which are controlled independently can modulate incident lights arbitrarily. In order to do this, it is required that incident lights are deflected to a desired arbitrary direction by controls of two degrees of freedom rotation or controls of two degrees of freedom rotation and one degree of freedom translation. Independent translation of each micromirror is also required to satisfy the phase condition. Because the DCM have many advantages and can have two degrees of freedom rotation and/or one degree of freedom translation, the micromirror array comprising the DCM has better performance than the conventional micromirror array.

In one embodiment of the present invention, a micromirror control system includes a bottom layer configured to support the micromirror control system, a stopper plate communicatively coupled to a support member first end, and configured to rotate about an axis at a support member second end. The micromirror control system also includes a micromirror plate or micromirror, having a top side and a bottom side, communicatively coupled to the stopper plate on a bottom side, and including a reflective surface on the top side configured to reflect light. Rotation of the stopper plate about the axis into contact with the micromirror is configured to adjust an orientation of the micromirror.

In another embodiment of the present invention, the micromirror control system also includes an actuating device communicatively coupled to the stopper plate, and configured to control the rotation of the stopper plate about the axis. In one aspect, the actuating device includes an electrode, configured to control the rotation of the stopper plate by electrostatic force. In another aspect, the actuating device includes a comb-drive, configured to control the rotation of the stopper plate by mechanical force.

In another embodiment of the present invention, a micromirror control system includes a bottom layer configured to support the micromirror control system components, and a support member. The support member coupled to the micromirror control system bottom layer at a first end and rotatably coupled to a stopper plate at a second end, wherein the support member is configured to support and provide a rotational axis for the stopper plate. The stopper plate is rotatably coupled to the support member and configured to rotate about the support member and to support a micromirror post. The micromirror post is optionally coupled to the stopper plate or coupled to a bottom side of a micromirror, wherein the micromirror post is configured to rest on the stopper plate. The micromirror has the bottom side coupled to the micromirror post and a top side including a reflective surface configured to reflect light. An actuating device is communicatively coupled to the stopper plate and configured to control the rotation of the stopper plate. The rotation of the stopper plate about the axis into contact with the micromirror is configured to adjust an orientation of the micromirror.

In another embodiment of the present invention, a method for controlling rotation and translation movement of a discretely controlled micromirror control system including a micromirror, at least one stopper plate, and a bottom layer configured to support the micromirror control system, including the steps of rotating the stopper plate to adjust an orientation of a micromirror, resting the micromirror plate on the rotated stopper and then reflecting light from the micromirror according to the adjusted orientation. An actuating device being communicatively coupled to the stopper plate is configured to control rotation of the stopper plate.

The advantages of the present invention include the ability to finely control translation and rotation of a discretely controlled micromirror.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
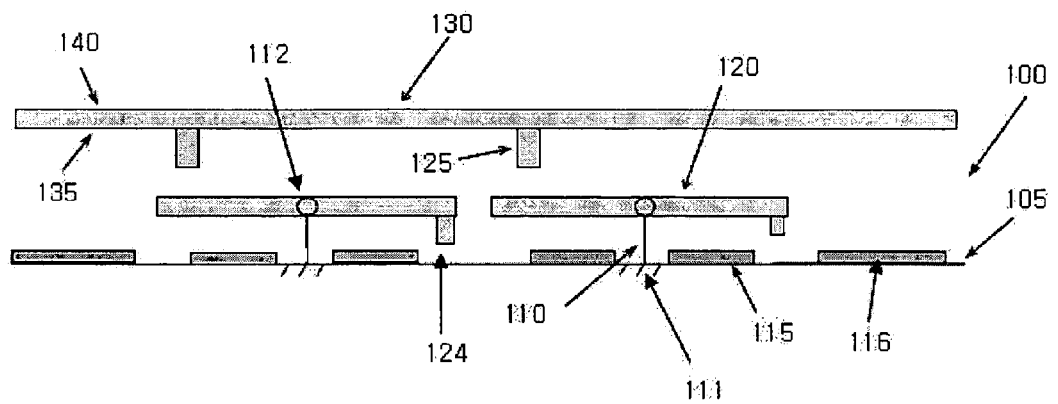
FIGS. 1A-1E are schematic diagrams showing a micromirror control system, according to the embodiments of the present invention.
Figure 1B:
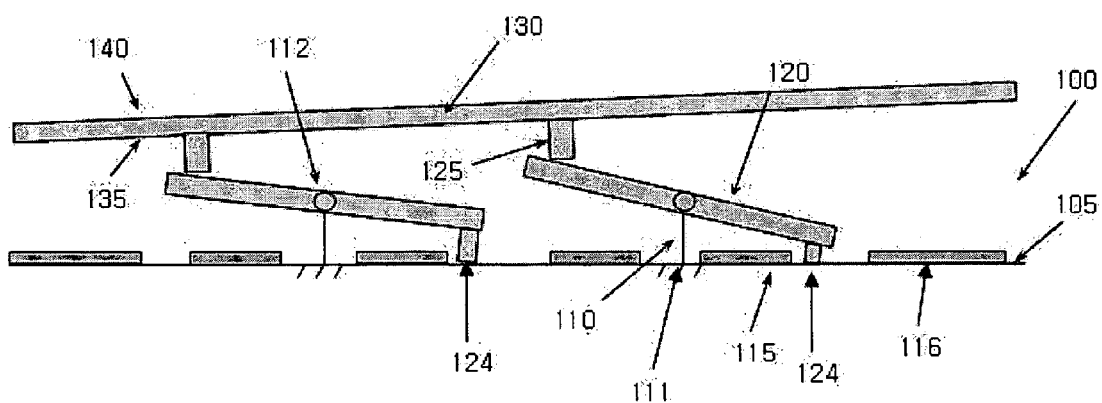
Figure 1C:
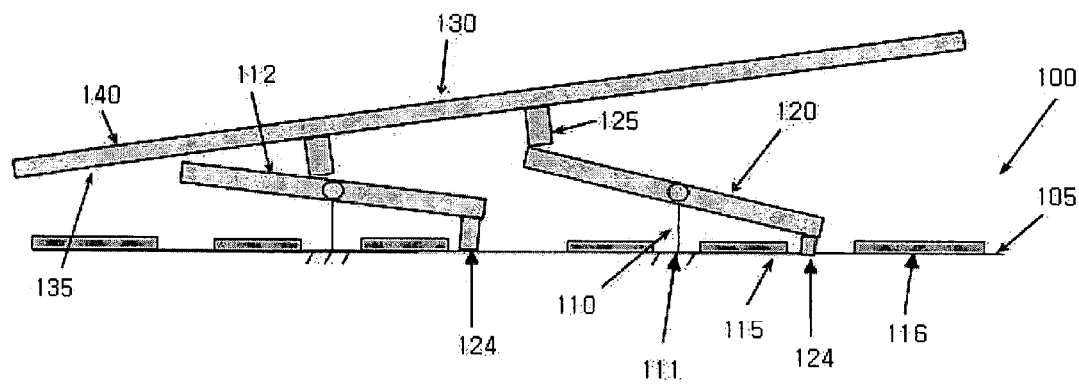
Figure 1D:
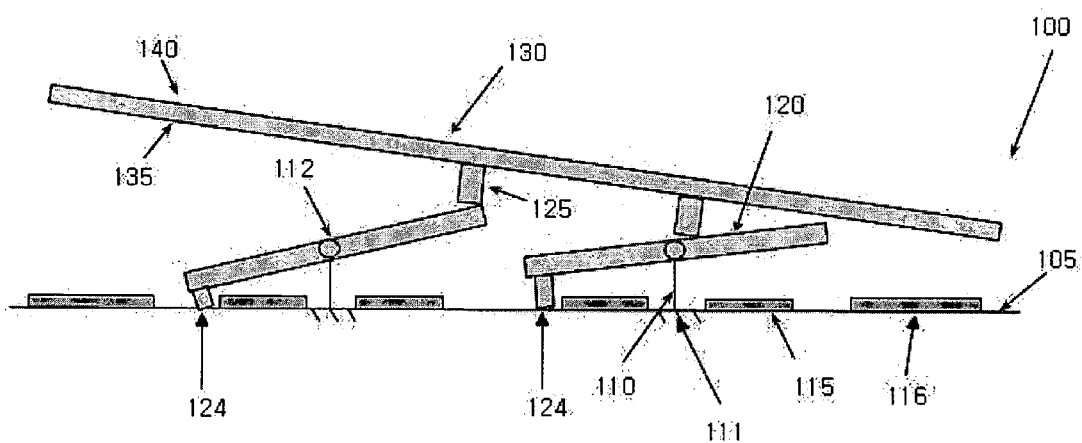

FIGS. 1A-1E show a micromirror control system 100 for a discretely controlled micromirror (DCM) 130, according to an embodiment of the present invention. The micromirror control system 100 includes a bottom layer 105 configured to support other micromirror control system components, such as, a stopper plate 120, a support member 110, and a micromirror plate, i.e. micromirror 130. The support member 110 is coupled to the bottom layer 105 at a first end 111 and rotatably coupled to the stopper plate 120 at a second end 112. The support member 110 is configured to support and provide a rotational axis for the stopper plate 120. The stopper plate 120 is rotatably coupled to the support member 110 and configured to rotate about the support member 110 and to support a micromirror post 125. The micromirror post 125 is coupled to a micromirror 130 bottom side 135. Alternatively, the micromirror post is coupled to the stopper plate 120. The micromirror post 125 is configured to rest on the stopper plate 120, as shown in FIGS. 1B-1D. The micromirror 130 has a bottom side 135 coupled to the micromirror post 125 and a top side 140 having a reflective surface configured to reflect light. An actuating device 115 is communicatively coupled to the stopper plate 120 and configured to control the rotation of the stopper plate 120. The rotation of the stopper plate 120 about the axis into contact with the micromirror 130 is configured to adjust an orientation of the micromirror 130. The actuating device 115 may be mechanically coupled to the bottom layer 105, as shown in FIGS. 1A-3B. The actuating device may include a micromirror electrode 116 to pull the micromirror 130 down to rest the micromirror 130 on the stopper plate.

In operation of the micromirror control system 100, the stopper plates 120 rotate and the position of the micromirror 130 is adjusted as it contacts the rotated stopper plates 120. The slopes of the stopper plates 120 at least partially determine the amount of rotation and translation of the micromirror 130 by allowing the micromirror posts 125 to move into contact with the stopper plates 120. That is, when the slope of the stopper plates 120 change, the micromirror 130 may move as the micromirror posts 125 'fall' into contact with the stopper plates 120. The micromirror fall into contact with the stopper plates by attraction force of the micromirror electrode 116. In this embodiment, movement of the micromirror 130 is caused by micromirror electrode 116, and the action caused by the actuating device 115 to the stopper plates 120. For example, the actuating device may include an electrode that exerts electrostatic force to move the stopper plates 120, as described further with reference to FIGS. 3A-3B.

In another embodiment, the position of the micromirror posts 125 with respect to the bottom side 135 of the micromirror 130 does not change. Rather, contact of the stopper plates 120 with the micromirror 130 determines the displacement of the micromirror. For example, contact by one pair of the stopper plates 120 may determine one displacement of micromirror 130. In order to get multi-displacement of micromirror 130, multiple pairs of the stopper plates 120 are located under the micromirror 130. Furthermore, the displacement of the micromirror 130 is affected by the position and height of the corresponding micromirror posts 125 and stopper posts 124. The position of the corresponding micromirror posts 125 may be fixed, but the placement of the micromirror posts 125 with respect to the bottom side 135 of the micromirror 130 may vary among the different micromirror posts 125. The position of the corresponding stopper posts 124 may be fixed, but the placement of the stopper posts 124 with respect to the bottom side 135 of the stopper plate 120 may vary among the different stopper posts 124. Additionally, the position and size of the stopper plates 120, as well as the distance from the bottom layer 105 to the stopper plates 120 are also factors that affect the amount of rotation and translation of the micromirror 130.

Figure 1E:
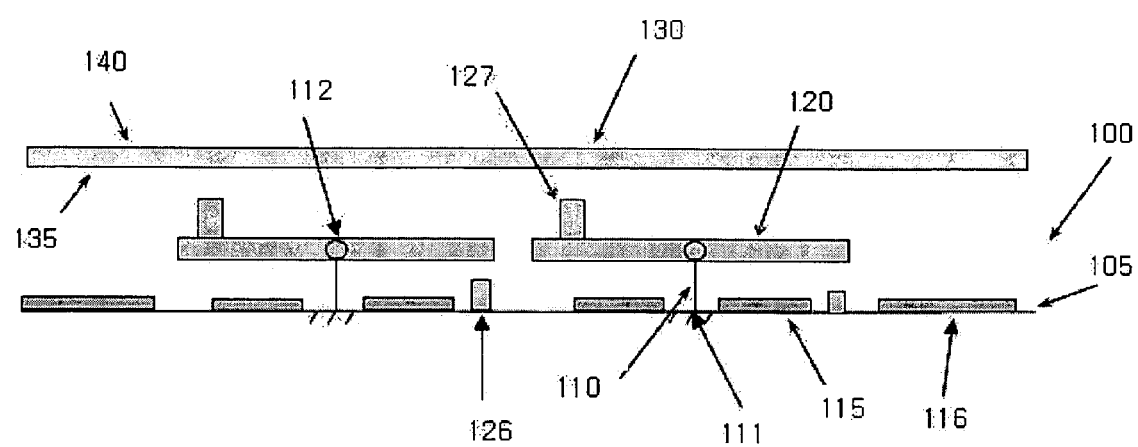

By way of example, micromirror posts 125 are attached to the bottom side of micromirror 135, as shown in FIGS. 1A-1D. Alternatively, the micromirror posts 127 can be attached to the top side of stopper plate, as shown in FIG. 1E. Furthermore, the stopper plate posts 126 are attached to the bottom side of stopper plate, as shown in FIGS. 1A-1D. Alternatively, the stopper posts 126 can be attached to the micromirror control system bottom layer 105, as shown in FIG. 1E.

Those skilled in the art will appreciate that many combinations of micromirror post and stopper plate post placements are possible to determine the discrete displacement of the micromirror. For example, a micromirror control system having the micromirror posts attached to the bottom side of micromirror and the stopper post attached to the top side of the bottom layer; micromirror posts attached to the top side of stopper plate and stopper posts attached to the bottom side of stopper plate; and having no micromirror post and stopper posts attached to the bottom side of stopper plate.

Figure 2A:
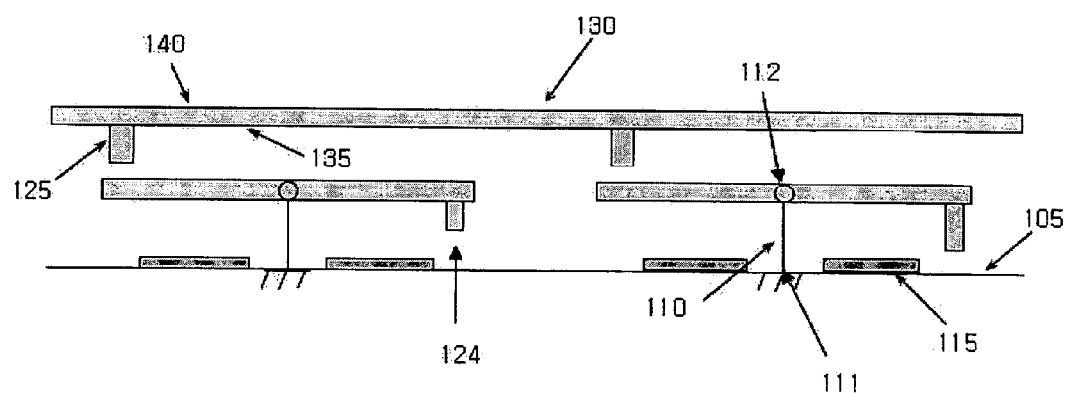
FIGS. 2A-2B are schematic diagrams showing a micromirror control system, according to another embodiment of the invention.
Figure 2B:
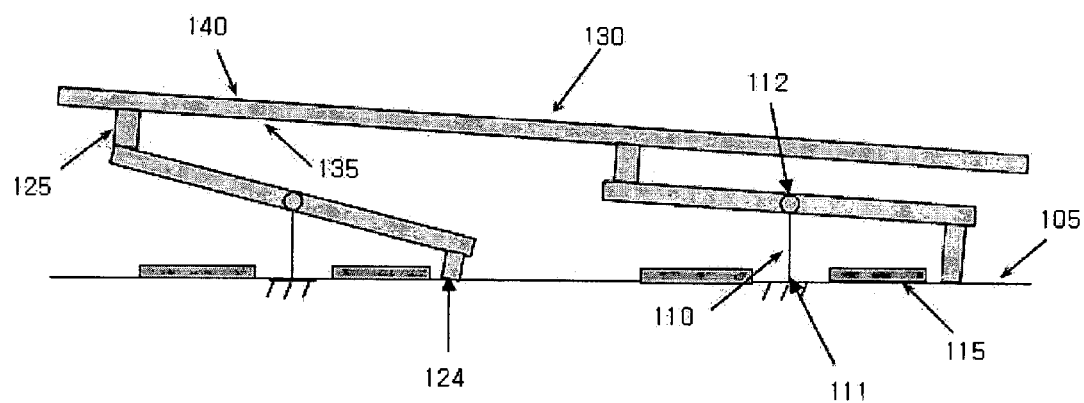

FIGS. 2A-2B show a micromirror control system, according to another embodiment of the invention. In operation of the micromirror control system 100, the stopper plates 120 rotate, and communicatively contacting the micromirror 130, thereby pushing the micromirror 130 into an adjusted position of orientation, see FIG. 2B. That is, movement of the micromirror 130 is due to pushing by the stopper plates 120. The stopper plate post 124 attached to the stopper plate bottom side determines the amount of rotation and translation of the micromirror 130.

Figure 3A:
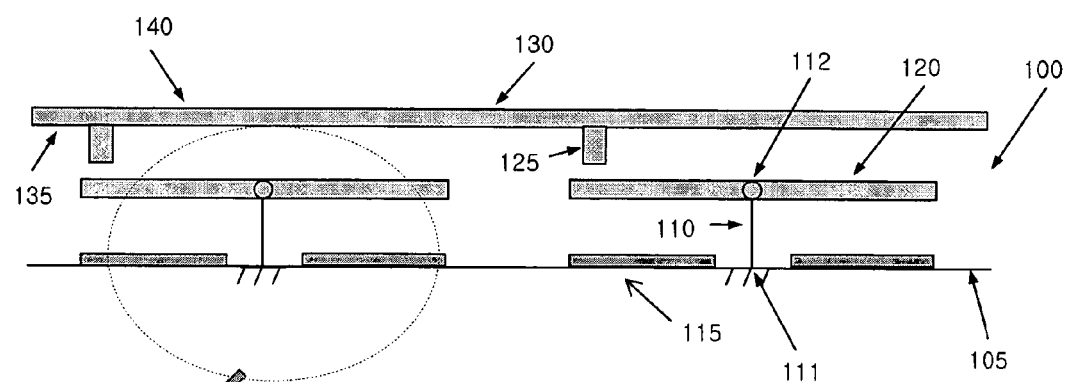
FIGS. 3A-3C are schematic diagrams showing movement of stopper plates of the micromirror control system, according to an embodiment of the invention.
Figure 3B:
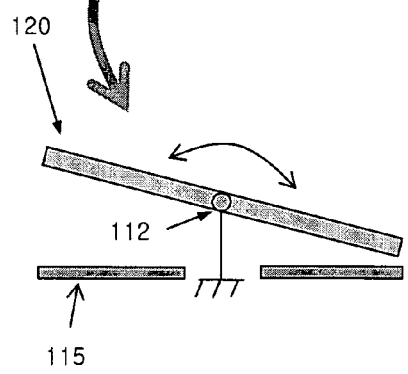
Figure 3C:
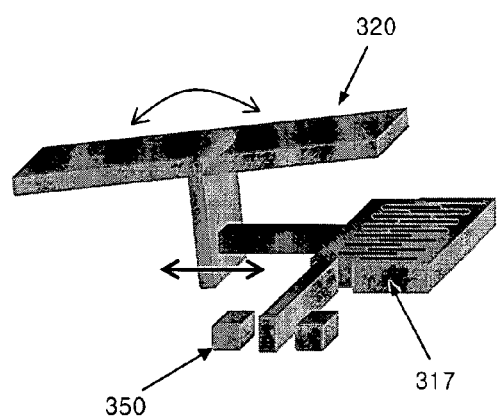

FIGS. 3A-3C illustrate movement of the stopper plates of the micromirror control system 100, according to another embodiment of the present invention. FIG. 3B shows, an actuating device including an electrode 115, wherein the movement of the stopper plate 120 is activated by electrostatic force exerted by the electrode 115. That is, the electrode 115 is configured to control the rotation of the stopper plates 120 by electrostatic force.

FIG. 3C shows an actuating device including a stopper plate 320, a support member (not shown) is coupled to the stopper plate 320, and a comb-drive 317 coupled to the support member. Movement of the stopper plates 320 is activated by force generated by the comb-drive 317. The comb-drive displacement is determined by position of "stops" 350. That is, the comb-drive 317 is configured to control the rotation of the stopper plates 320 by mechanical force.

With reference to FIG. 3B, note that the stopper plate 120 rotates about an axis at the second end 112 of the support member 110, while in the embodiment depicted in FIG. 3C, the stopper plate 320 rotates about an axis at a first end of the support member (not shown).

Figure 4:
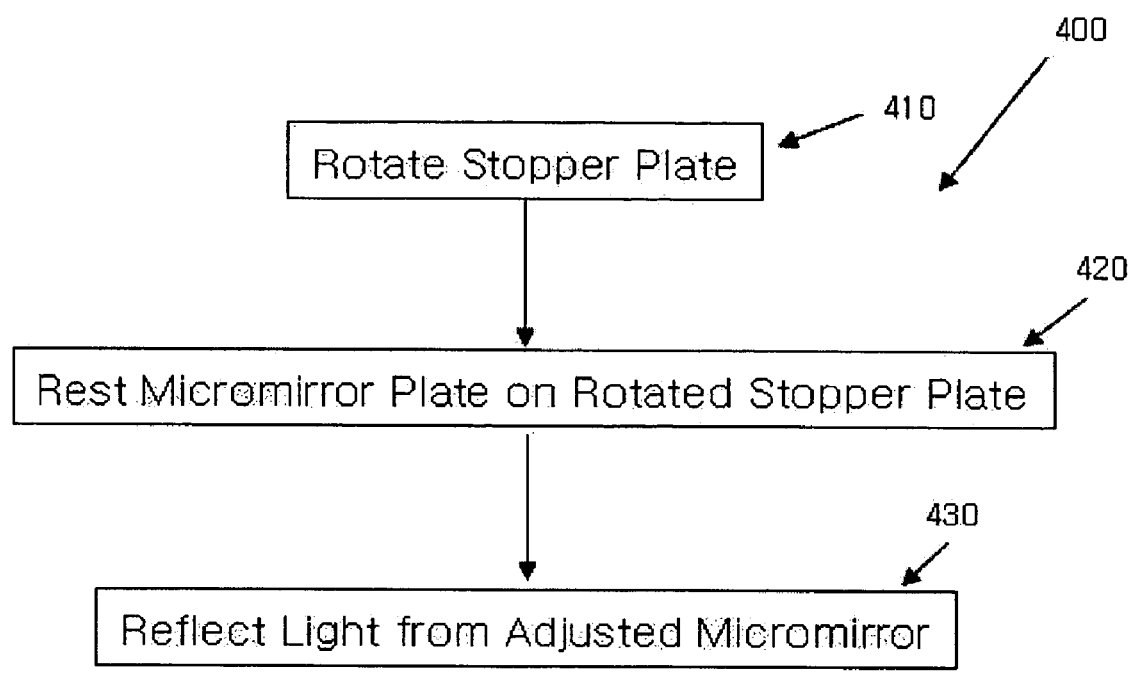
FIG. 4 is a flow diagram of a method for controlling rotation and translation movement of a discretely controlled micromirror control system including a micromirror, at least one stopper plate, and a bottom layer configured to support the micromirror control system, according to an embodiment of the invention.

FIG. 4 is a flow diagram of a method 400 for controlling rotation and translation movement of a discretely controlled micromirror, control system including a micromirror, at least one stopper plate, and a bottom layer configured to support the micromirror control system, according to another embodiment of the present invention. At step 410, a stopper plate is rotated to adjust an orientation of a micromirror. At step 420, resting the micromirror plate on the rotated stopper. At step 430, the micromirror reflects light according the adjusted orientation. An actuating device being communicatively coupled to the stopper plate is configured to control rotation of the stopper plate.

The techniques presented herein provide for fine, very fine and/or delicate control of micromirror movement and/or orientation by rotation and/or translation. The micromirrors may be moved individually or simultaneously with other micromirrors.

The advantages of the present invention include the ability to finely control translation and rotation of a discretely controlled micromirror.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A micromirror control system, comprising:
   a bottom layer configured to support the micromirror control system;
   at least one stopper plate configured to rotate about an axis having a top side and a bottom side;
   a micromirror having a top side and a bottom side, communicatively coupled to the stopper plate on the bottom side, and including a reflective surface on the top wide configured to reflect light; and
   at least one stopper plate post attached to the stopper plate bottom side wherein the stopper plate post communicatively contacts the bottom layer;
   wherein rotation of the stopper plate about the axis into contact with the micromirror is configured to adjust an orientation of the micromirror.

2. The micromirror control system of claim 1, further comprising an actuating device, communicatively coupled to the stopper plate, configured to control the rotation of the stopper plate about the axis.

3. The micromirror control system of claim 2, wherein the actuating device includes an electrode, configured to control the rotation of the stopper plate by electrostatic force.

4. The micromirror control system of claim 3, wherein the actuating device includes a micromirror electrode, configured to pull the micromirror down to rest the micromirror on the stopper plate.

5. The micromirror control system of claim 2, wherein the actuating device includes a comb-drive, configured to control the rotation of the stopper plate by mechanical force.

6. The micromirror control system of claim 1, wherein the stopper plate comprises a support member, the support mentor having a first end and a second end, the first and coupled to the micromirror control system bottom layer, and the second end coupled to the stopper plate bottom side.

7. The micromirror control system of claim 1, further comprising a plurality of micromirror post attached to the stopper plate bottom side, the micromirror post communicatively contacting the bottom layer to adjust the orientation of the micromirror.

8. The micromirror control system of claim 1, further comprising a plurality of micromirror post attached to the stopper plate top side, the micromirror post communicatively contacting the micromirror bottom side to adjust the orientation of the micromirror.

9. The micromirror control system of claim 1, wherein the stopper plate post attached to the bottom layer, the stopper plate post communicatively contacting the bottom side of the stopper plate to adjust the orientation of the micromirror.

10. The micromirror control system of claim 1, wherein the micromirror has two degrees of freedom rotation and/or one degree of freedom translation.

11. A micromirror control system, comprising:
    a bottom layer configured to support the micromirror control system;
    at least one support member having a first end and a second end, the first end coupled to the bottom layer;
    at least one stopper plate rotatably coupled to the support member second end providing a rotational axis about the support member second end;
    a plurality of micromirror posts communicatively coupled to a micromirror and communicatively coupled the stopper plate; and
    an actuating device communicatively coupled to the stopper plate to control the rotation of the stopper plate;
    wherein, the stopper plate rotates about the axis into contact with the micromirror posts to adjust an orientation of the micromirror.

12. The micromirror control system of claim 11, wherein the actuating device comprises an electrode configured to control the rotation of the stopper plate by electrostatic force.

13. The micromirror control system of claim 11, wherein the actuating device includes a micromirror electrode, configured to pull the micromirror down to rest the micromirror on the stopper plate.

14. The micromirror control system of claim 11, wherein the actuating device comprises a comb-drive, configured to control the rotation of the stopper plate by mechanical force.

15. The micromirror control system of claim 11, wherein the micromirror comprises a bottom side and a top side, the top side having a reflective surface configured to reflect light.

16. The micromirror control system of claim 15, wherein the stopper plate comprises a top side and a bottom side, the micromirror post attached to the stopper plate top side, the micromirror post communicatively contacting the micromirror bottom aide to adjust the orientation of the micromirror.

17. The micromirror control system of claim 16, wherein the stopper plate further comprises a stopper plate post attached at the stopper plate bottom side to adjust the orientation of the micromirror.

18. The micromirror control system of claim 15, wherein the stopper plate comprises a top side and a bottom side, the micromirror post attached to the micromirror bottom side, the micromirror post communicatively contacting the stopper plate top side to adjust the orientation of the micromirror.

19. The micromirror control system of claim 18, wherein the stopper plate further comprises a stopper plate post attached at the micromirror control system bottom layer to adjust the orientation of the micromirror.

20. The micromirror control system of claim 11, wherein the micromirror has two degrees of freedom rotation and/or one degree of freedom translation.

21. A method for controlling rotation and translation movement of a discretely controlled micromirror control system including a micromirror, at least one stopper plate, and a bottom layer configured to support the micromirror control system, comprising:
    rotating the at least one stopper plate to adjust an orientation of the micromirror;
    resting the micromirror on the rotated stopper plate; and
    reflecting light from the micromirror according to the adjusted orientation.

22. The method of claim 21, wherein an actuating device communicatively coupled to the stopper plate is configured to control rotation of the stopper plate.

23. The method of claim 22, wherein the actuating device is an electrode configured to control the rotation of the stopper plate by electrostatic force.

24. The method of claim 22, wherein the actuating device is a comb-drive, configured to control the rotation of the stopper plate by mechanical force.

25. The method of claim 22, wherein the micromirror has two degrees of freedom rotation and/or one degree of freedom translation.

26. The method of claim 21, wherein the micromirror control system further comprises a plurality of micromirror post attached to a micromirror bottom side, the micromirror post communicatively contacting the stopper plate to adjust the orientation of the micromirror.

27. The method of claim 21, wherein the micromirror control system further comprises a micromirror post attached to a stopper plate top side, the micromirror post communicatively contacting a micromirror bottom side to adjust the orientation of the micromirror.

28. A micromirror control system, comprising:
    a bottom layer configured to support the micromirror control system;
    at least one stopper plate configured to rotate about an axis having a top side and a bottom side;
    a micromirror having a top side and a bottom side, communicatively coupled to the stopper plate on the bottom side, and including a reflective surface on the top side configured to reflect light; and
    at least one micromirror post communicatively coupled to the micromirror and communicatively coupled to the stopper plate;
    wherein rotation of the stopper plate about the axis into contact with the micromirror is configured to adjust an orientation of the micromirror.

29. The micromirror control system of claim 28, further comprising an actuating device, communicatively coupled to the stopper plate, configured to control the rotation of the stopper plate about the axis.

30. The micromirror control system of claim 29, wherein the actuating device includes an electrode, configured to control the rotation of the stopper plate by electrostatic force.

31. The micromirror control system of claim 30, wherein the actuating device includes a micromirror electrode, configured to pull the micromirror down to rest the micromirror on the stopper plate.

32. The micromirror control system of claim 29, wherein the actuating device includes a comb-drive, configured to control the rotation of the stopper plate by mechanical force.

33. The micromirror control system of claim 28, wherein the stopper plate comprises a support member, the support member having a first end and a second end, the first end coupled to the micromirror control system bottom layer, and the second end coupled to the stopper plate bottom side.

34. The micromirror control system of claim 28, wherein the micromirror post attached to the micromirror bottom side, the micromirror post communicatively contacting the stopper plate to adjust the orientation of the micromirror.

35. The micromirror control system of claim 28, wherein the micromirror post attached to the stopper plate top side, the micromirror post communicatively contacting the micromirror bottom side to adjust the orientation of the micromirror.

36. The micromirror control system of claim 28, further comprising a plurality of stopper plate post attached to the stopper plate bottom side communicatively contacting the bottom layer to adjust the orientation of the micromirror.

37. The micromirror control system of claim 28, further comprising a plurality of stopper plate attached to the bottom layer communicatively contacting the bottom aids of the stopper plate to adjust the orientation of the micromirror.

38. The micromirror control system of claim 28, wherein the micromirror has two degrees of freedom rotation and/or one degree of freedom translation.

39. A micromirror control system, comprising:
    a bottom layer configured to support the micromirror control system;
    at least one stopper plate configured to rotate about an axis having a top side and a bottom side;
    a micromirror having a top side and a bottom side, communicatively coupled to the stopper plate on the bottom side, and including a refelective surface on the top side configured to reflect light; and
    at least one stopper plate post attached to the bottom layer, wherein the stopper plate post communicatively contacts the bottom side of the stopper plate;
    wherein rotation of the stopper plate about the axis into contact with the micromirror is configured to adjust an orientation of the micromirror.

40. The micromirror control system of claim 39, further comprising an actuating device, communicatively coupled to the stopper plate, configured to control the rotation of the stopper plate about the axis.

41. The micromirror control system of claim 40, wherein the actuating device includes an electrode, configured to control the rotation of the stopper plate by electrostatic force.

42. The micromirror control system of claim 41, wherein the actuating device includes a micromirror electrode, configured to pull the micromirror down to rest the micromirror on the stopper plate.

43. The micromirror control system of claim 40, wherein the actuating device includes a comb-drive, configured to control the rotation of the stopper plate by mechanical force.

44. The micromirror control system of claim 39, wherein the stopper plate comprises a support member, the support member having a first end and a second end, the first end coupled to the micromirror control system bottom layer, and the second end coupled to the stopper plate bottom side.

45. The micromirror control system of claim 39, further comprising a plurality of micromirror post attached to the stopper plate bottom side, the micromirror post communicatively contacting the bottom layer to adjust the orientation of the micromirror.

46. The micromirror control system of claim 39, further comprising a plurality of micromirror post attached to the stopper plate top side, the micromirror post communicatively contacting the micromirror bottom side to adjust the orientation of the micromirror.

47. The micromirror control system of claim 39, wherein the stopper plate post attached to the stopper plate bottom side, the stopper plate post communicatively contacting the bottom layer to adjust the orientation of the micromirror.

48. The micromirror control system of claim 39, wherein the stopper plate post attached to the bottom layer, the stopper plate post communicatively contacting the bottom side of the stopper plate to adjust the orientation of the micromirror.

49. The micromirror control system of claim 39, wherein the micromirror has two degrees of freedom rotation and/or one degree of freedom translation.

* * * * *